R. T. TAYLOR.
Shield for Corn Plow.
No. 83,340.
Patented Oct. 20, 1868.
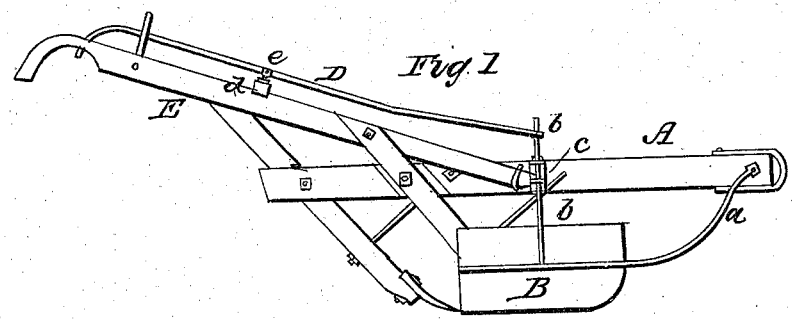
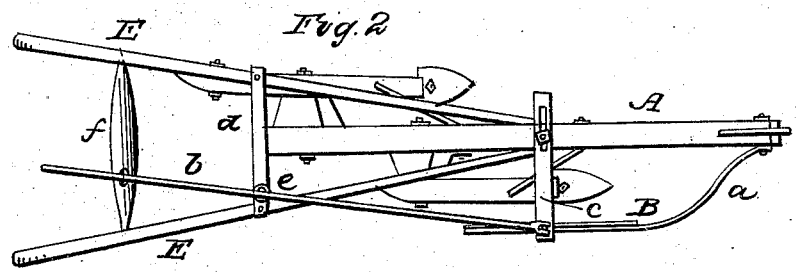

R. T. TAYLOR, OF EVERTON, INDIANA.

Letters Patent No. 83,340, dated October 20, 1868.

IMPROVEMENT IN SHIELDS FOR CORN-PLANTERS.

The Schedule referred to in these Letters Patent and making part of the same.

*To all whom it may concern:*

Be it known that I, R. T. TAYLOR, of Everton, in the county of Fayette, and State of Indiana, have invented a certain new and useful Improvement in Shields for Corn-Plows; and do hereby declare that the following is a full, clear, and exact description thereof, reference being had to the accompanying drawings, and to the letters of reference marked thereon.

The nature of my invention consists in an adjustable shield to be attached to a plow, so that corn may be plowed just as close as may be desired, without in the least injuring or covering up the corn.

In order to enable others skilled in the art to make and use my invention, I will now proceed to describe its construction and operation, referring to the annexed drawings, which form a part of this specification, and in which—

Figure 1 is a side view,

Figure 2 a plan view, and

Figure 3 a rear view of the device, by which the lever that raises or lowers the shield is held.

A represents the plow-beam of an ordinary double-shovel plow.

The shield B, which consists of a rectangular piece of sheet-iron, the lower forward corner of which is rounded off, is connected with the forward end of said plow-beam by means of a bent rod, $a$, which is riveted, or in any suitable manner fastened to the shield, and secured to the plow-beam by a bolt passing through the same, so that the said rod $a$ will allow the shield to be raised or lowered, as desired.

The shield is placed on the outside of the plow, and from its centre an upright rod, $b$, extends, which rod passes through holes on the metal stay, $c$.

This metal stay has two slotted arms, extending, one above and one below the plow-beam, to which they are secured by means of a screw-bolt and nut, said screw-bolt passing through the slots on these arms, and through the plow-beam, so that the shield may be moved closer to or further from the plow, as may be desired.

The upper end of the rod $b$, above the stay $c$, is secured to the lever D, which extends backwards, and is pivoted in a clamp, $e$, on the cross-bar $d$, which latter is secured to the handles E E of the plow.

The rear end of the lever D is secured and regulated on the cross-bar $f$, connecting the handles E E with each other, by means of an upright ratch-bar, $g$, and a bent spring, $h$, pressing the end of the lever against and in the notches on said ratch-bar, as shown in fig. 3.

By this arrangement, the shield B may be raised or lowered, and held in any position desired.

Having thus fully described my invention,

What I claim as new, and desire to secure by Letters Patent, is—

1. The adjustable shield B, constructed and attached to the plow in the manner described, and operated by means of the slotted arms on the stay $c$, and the lever D, substantially as and for the purposes herein set forth.

2. The ratch-bar $g$, in combination with the bent spring $h$, for the purpose of holding the lever D at any point desired, thereby adjusting the shield B, substantially as and for the purposes herein set forth.

In testimony that I claim the foregoing, I have hereunto set my hand, this 26th day of May, 1868.

R. T. TAYLOR.

Witnesses:
 JNO. B. SCHISSLER,
 J. A. HANSON.